United States Patent [19]

Dunham et al.

[11] Patent Number: 5,109,803

[45] Date of Patent: May 5, 1992

[54] PADDED SLEEVE FOR PET COLLAR

[76] Inventors: Jeffrey W. Dunham, 11086 N. Six Lakes Rd., Six Lakes, Mich. 48886; Richard A. Carson, 7743 W. Lincoln Rd., Elwell, Mich. 48832; Bernard J. Grosskopf, 10931 Edgar Rd., Vestaburg, Mich. 48891

[21] Appl. No.: 646,213

[22] Filed: Jan. 28, 1991

[51] Int. Cl.$^5$ ............................................. A01K 27/00
[52] U.S. Cl. ................................................. 119/106
[58] Field of Search .................... 119/96, 106, 156; 54/65, 67

[56] References Cited

U.S. PATENT DOCUMENTS

| | | | |
|---|---|---|---|
| 2,342,066 | 2/1944 | Tramill | 119/106 |
| 2,401,253 | 5/1946 | Land, Jr. | 119/106 |
| 3,466,852 | 9/1969 | Stoner | 54/65 |
| 4,047,505 | 9/1977 | McAndles | 119/156 X |
| 4,184,452 | 1/1980 | Buzzell et al. | 119/156 X |

FOREIGN PATENT DOCUMENTS 2160405 12/1985 United Kingdom ............... 119/106

*Primary Examiner*—Gene Mancene
*Assistant Examiner*—Thomas Price
*Attorney, Agent, or Firm*—Robert K. Wallor

[57] ABSTRACT

A typical pet collar is encased in a sleeve of a pliant, non-chafing material including padding on at least one surface in contact with a pet neck region. The sleeve is formed as an annular cylinder having a longitudinal overlapped portion. A plurality of releasable fasteners is distributed along the length to hold the overlapped flaps together to form the annular cylinder. Appropriate pesticides, deodorizing fragrances, and/or perfumes may be distributed along the interior length of the sleeve so as to be out of contact with the pet. In an alternate embodiment, the annular cylinder may be formed to have a longitudinal seam.

10 Claims, 1 Drawing Sheet

U.S. Patent    May 5, 1992    5,109,803
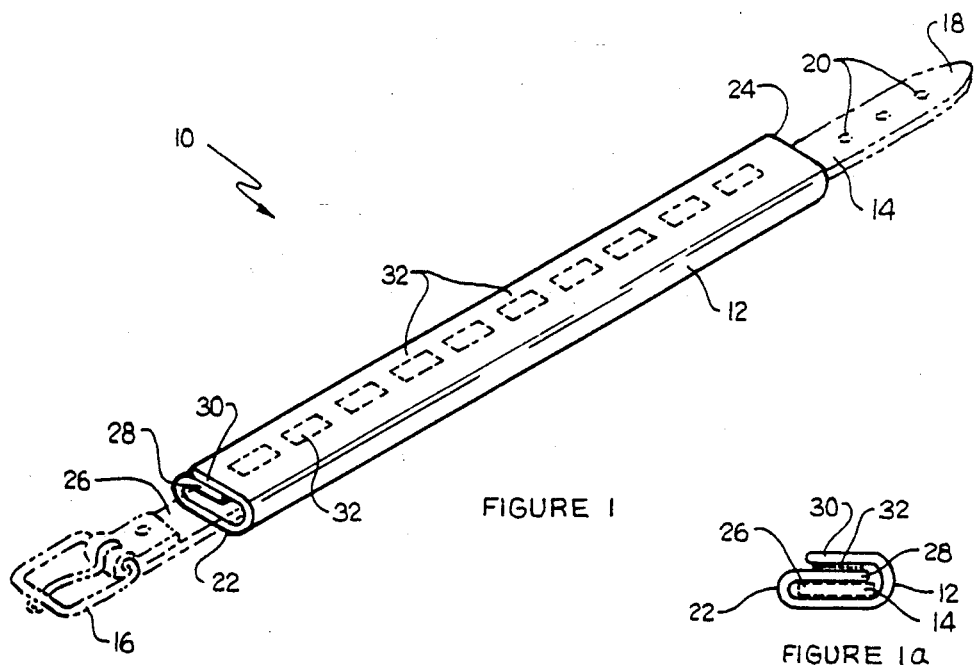
FIGURE 1
FIGURE 1a
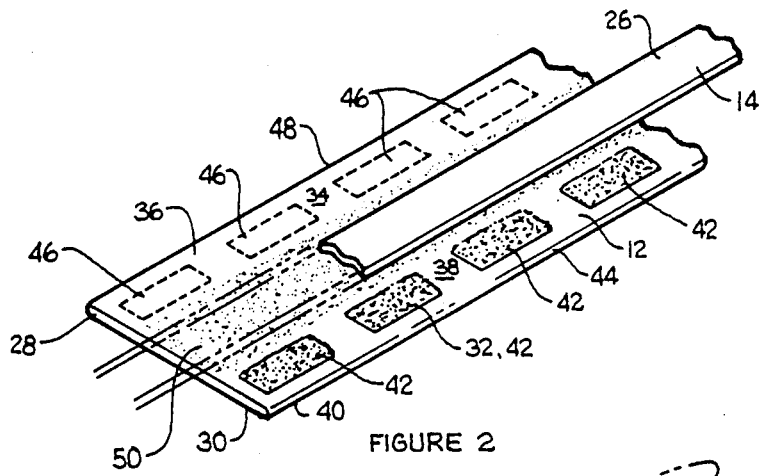
FIGURE 2
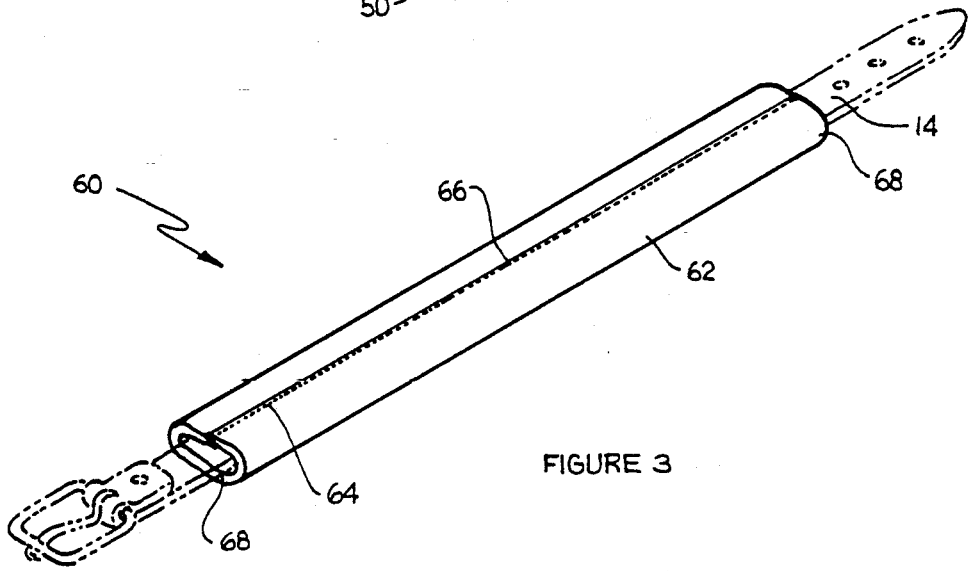
FIGURE 3

PADDED SLEEVE FOR PET COLLAR

BACKGROUND OF THE INVENTION

1. Field of the Invention

This invention relates to means for padding a collar used for encircling the neck of a pet, and more particularly, to a removable padding means providing for internal retention of pet pesticides, fragrances, and/or perfumes so as to avoid allergic or toxic contact with the pet.

2. Description of the Prior Art

Straps and collars for pets are well known in the art, and padding for such straps and collars has been previously described in several forms. For example, with regard to straps, U.S. Pat. No. 2,676,736, issued Apr. 27, 1954 to ZIRBEL, and U.S. Pat. No. 3,435,867, issued Apr. 1, 1969 to HYDEN, provide for detachable, relocatable pads for use on shoulder straps of golf bags to increase the comfort of a person carrying such a golf bag. This type of pad is also affixable to shoulder straps and hand grips used for various types of luggage.

With regard to pet collars, a number of prior patents, such as U.S. Pat. No. 646,026, issued May 8, 1900 to WOOD, U.S. Pat. No. 971,392, issued Sep. 27, 1910 to MICKA, U.S. Pat. No. 2,798,458, issued Jul. 9, 1957 to ODERMATT, U.S. Pat. No. 3,817,Z18, issued Jun. 18, 1974 to BONGIOVANNI, U.S. Pat. No. 4,020,795, issued May 3, 1977 to MARKS, and U.S. Pat. No. 4,719,876, issued Jan. 19, 1988 to WILKEN, describe the application of an enclosing material around the length of a basic pet or animal collar. The patents to Wood, Micka, Odermatt, Bongiovanni, and Marks provide for non-chafing covers over the basic pet collar, generally without concern for removability of the cover. Micka uses his collar pad for securing live decoy ducks in a duck hunting scenario without injury to the decoy ducks. Odermatt includes a bright, phosphorescent outer covering useful in locating the pet wearing such a collar. Marks also suggests that the padding may be impregnated with a pesticide, the entire pad being discarded when the effectiveness of the pesticide has been lost. Of course, the pesticide impregnation of the pad used by Marks places the pesticide into direct contact with the fur and skin of the pet. Wilken teaches, as a further use of such collar pads, the use of a substantially stiff, wide pad element around a collar so that head movement relative to the body of the animal is severely constrained so as to preclude the pet from biting or licking itself.

SUMMARY OF THE INVENTION

Accordingly, an object of the present invention is to provide a padded sleeve for a pet collar that is capable of being removed from the collar by opening the padded encasement along the length of the collar.

Another object of the present invention is to provide a padded sleeve for a pet collar that may repeatedly be removed from the collar, cleaned, and replaced onto the collar.

An additional object of the present invention is to provide a padded sleeve for a pet collar that may be repeatedly internally filled with an appropriate pet pesticide so as to retain the pesticide from direct contact with the fur and skin of the pet, yet providing openings to the interior of the padded sleeve to enable pet pests to enter therein seeking a warm, moist, and dark interior thereof, the pests thereby contacting the pesticide therein.

A further object of the present invention is to provide a padded sleeve for a pet collar that may be repeatedly internally filled with a fragrance material or a perfume to provide a more pleasing odor for the pet.

It is also an object of the present invention to provide a padded sleeve for a pet collar that may be readily fabricated in a variety of lengths commensurate with a range of collar lengths for different size pets.

It is another object of the present invention to provide a padded sleeve for a pet collar that may be readily fabricated in a variety of colors for marketing with collars of the same or appropriately contrasting colors.

It is a further object of the present invention to provide a padded sleeve for a pet collar that may be readily manufactured at a minimal expense.

These, and other objects, advantages, and features of the present invention that may become apparent through the subsequent descriptions thereof, are accomplished by fabrication of a padded sleeve for a pet collar, comprising an improvement in fabrication of material devices used to encase standard leather, chain, synthetic webbing type, or plastic, pesticide impregnated pet collars. In this improvement, a substantially rectangular planar portion of an appropriate durable, pliable material or layered combination of materials, appropriately including padding, is formed to have at least one planar surface thereof sufficiently smooth and/or pliant so as to be substantially non-chafing when in contact with the fur and skin of the wearing animal. The rectangular material is configured to have a length dimension commensurate with the circumferential size of the neck of the pet, which length is substantially equivalent to the length of the corresponding collar, excluding its buckle and opposed connecting end, when said collar is closed for wear by the pet. A width dimension of the rectangular material is, in a preferred embodiment of the present invention, determined to be that width enabling the planar rectangle to be folded along lines extending in the length direction such that the collar is fully enclosed therein, with overlap of the width sides of the material. More specifically, if the collar to be encased has a substantially rectangular cross-section transverse to its length, the material used to form the sleeve should have a width sufficient to traverse an upper width of the collar, pass downwardly along one side edge of the collar, traverse the under width of the collar, pass upwardly along the second side edge of the collar and again substantially traverse across the upper width of the collar having a first layer of material thereon. At least one of the exterior width spanning surfaces of the so folded material will include padding. In the preferred embodiment, mating hook and loop type fasteners are distributed, either continuously or in an intermittent spaced apart arrangement, along the length of the material between the layers of folded, overlapped width portions of the padding material.

Clearly, attachment of the fasteners is accomplished by affixing a distribution of hook portions of such fastener type along an upper surface, when the material is arranged as an open planar surface, of one of the marginal width portions, proximate to a side edge thereof, and correspondingly affixing a like distribution of loop portions of such fastener type along a lower surface of the opposed marginal width portion, proximate to its side edge. Thereafter, placement of the collar so that the length of the collar extends along the length of the padding material substantially centrally of its width, then folding the loop bearing marginal width portion over the collar along its length, and then folding the hook bearing marginal width portion over the collar and the loop bearing portion along the length of the collar enables the hook portions of the distributed fasteners to engage with the corresponding loop portions, thereby encasing the collar, except for the buckle, along its length. A quantity of an appropriate pet pesticide matter or of a perfume or fragrance material, or both, may be distributed along the length of the collar and the abutting surface of the material prior to performing the aforesaid foldings, such that the pesticide and the like will be entirely within the collar containing enclosure formed by the material when so folded and fastened. Retention of the pesticide and other additive materials within the interior space of the folded material minimizes the risk of contact between these additives and the pet, thereby reducing the risk of adverse allergic or toxic reactions by the pet that may be caused by contact with, or ingestion of, the additives.

It is also permissible to assemble the material into its folded form, with internally distributed additives, without having a belt or pet collar therein. The so folded material may then be placed onto a pet collar by threading the collar through the sleeve.

Other releasable fasteners, such as snaps, buttons and holes, zippers, or the like, may also be employed in a like manner to replace the aforesaid hook and loop type fasteners, each such embodiment allowing the material of the sleeve to be removed from the collar by opening along the length of the collar so that both the material and the collar may be cleaned as necessary. It is, of course, possible to remove the sleeve from the collar by sliding the sleeve off of the collar while the sleeve remains folded and fastened. Reopening of the fasteners so that the material may be unfolded also permits removal of pest remains and replenishment of the pesticide or other additives.

In an alternate embodiment, the width of the material is such that a collar would be completely encased around its width, but without the aforesaid overlap. Abutting edges of the material may then be sewn together along their length so as to form an annular cylinder having an internal dimension adapted to closely accept the cross-section of the collar longitudinally therethrough. Such a cylindrical sleeve element is emplaced on a corresponding collar by inserting an end of the collar into one open end of the cylinder and then translating the collar longitudinally through the enclosed volume along the length of the cylinder until the sleeve is appropriately placed along the length of the collar. Removal of the sleeve from the collar is accomplished in the reverse manner. Inclusion of pesticide and/or other additives within the internal space of the sleeve requires, in this embodiment, pouring the additives into one open end of the cylinder, and then distributing the additives along the length of the cylinder by appropriate shaking of the sleeve. In the alternative, a pesticide impregnated collar may be employed. The pliability of the material, including appropriate padding, enables the cylinder of this embodiment to be turned inside out for cleaning.

In use, the placement of a padded collar sleeve in accordance with the present invention generally provides that body heat from the wearing animal will keep the interior of the padded collar sleeve warm, and that perspiration and other body fluids from the wearing animal will be absorbed by the padding material to create a moist environment within the padded collar sleeve. Since most animal infesting pests enjoy warm, moist and dark environments, experience with padded collar sleeves in accordance with the present invention indicates that such pests tend to seek the open ends of the collar encasing sleeve and enter therein along the collar. If the padded sleeve contains a distribution of pesticide therein, such pests as enter the ends are killed. If the manner of distributing the fasteners of the preferred embodiment is such that longitudinally spaced apart segments of fasteners are employed, the separations between the fastener segments provide added points of access for pests to enter into the preferred interior environment, and thus into contact with any pesticide therein.

In each of the stated embodiments, reusability of the sleeve after its removal and cleaning is an available desired feature. In those padded collar sleeve utilizations that contain user introduced pesticides, the pesticides are generally substantially isolated from direct contact with the pet, both as to skin or fur contact and as to ingestion by licking or biting the collar or fur and skin proximate to the collar. This isolation greatly minimizes the risk of adverse allergic or toxic reaction to the pesticide on the part of the wearing pet, people, and other animals that may come into incidental contact with a wearing pet. Similar benefits accrue when other additives are considered. A further relevant advantageous feature of the present invention is the capabilty of producing such sleeves, and collars where appropriate, in a variety of lengths to fit pets of all sizes, and in a variety of bright or fashionable colors, with interchangeability of colors used on a given collar being merely a function of the selection of colored sleeves available to the user.

BRIEF DESCRIPTION OF THE DRAWING

In the drawing, wherein like reference numbers and symbols are used to refer to like elements, components, and features throughout:

FIG. 1 is a perspective view of a padded sleeve for a pet collar in accordance with the present invention;

FIG. 1a is an end view of a pet collar including a padded sleeve in accordance with the present invention;

FIG. 2 is a fragmented perspective view of a padded sleeve for a pet collar in accordance with the present invention, showing a sleeve thereof opened; and FIG. 3 is a perspective view of an alternate embodiment of a padded sleeve for a pet collar in accordance with the present invention.

DETAILED DESCRIPTION OF THE INVENTION

Referring first to FIG. 1, a preferred embodiment of a padded sleeve on a pet collar in accordance with the present invention is indicated generally at 10. The padded pet collar 10 comprises a sleeve element 12 enclosing a typical pet collar 14. The pet collar 14 has a length extending from, typically, a buckle 16 to an obverse distal free end 18 containing a plurality of longitudinally spaced apart holes 20 therethrough. The length dimension of the pet collar 14 is established to be commensurate with the size of the pet on which the pet collar 14 is to be utilized, the length along a surface of the pet collar 14 between the buckle 16 and at least one of the holes 20 at the distal end 18 being substantially equivalent to a circumferential neck dimension of the pet, allowing for some measure of looseness to avoid choking the pet during use of the collar 14. Thus, the length dimension of the pet collar 14 can be variable dependent upon the range of pets considered, with each pet collar 14 being fabricated to have a correspondingly adapted magnitude.

The sleeve element 12 is illustrated to encase the pet collar 14 along substantially the entire length of the pet collar 14, allowing for access at the buckle 16 and the distal end 18 to enable closure of the pet collar 14 around the neck of a pet. Thus, the sleeve element 12 has a corresponding length dimension between a first end 22 thereof and a second end 24 thereof which is, in magnitude, suited to the length of the pet collar 14 with which the sleeve element 12 is to be used. A closer examination of the first end 22 of the sleeve element 12, illustrated in FIG. 1a, shows that the material forming the sleeve element 12 passes completely around both surfaces forming the width of the pet collar 14 and, further, that the illustrated upper surface 26 of the pet collar 14 is enclosed by an overlapping of two layers 28, 30 of the sleeve material. A plurality of closure elements 32 are indicated to extend along the length of the sleeve element 12, the closure elements 32 being disposed generally between the lower layer 28 and the upper layer 30 of the overlapped sleeve material.

Referring next to FIG. 2, the sleeve element 12 of the preferred embodiment is illustrated to indicate that the upper layer 30 may be lifted from the lower layer 28 by release of the closure elements 32 along the length of the sleeve element 12, enabling the sleeve element 12 to be removed from the pet collar 14 and unfolded about longitudinally extending axes to assume a substantially planar rectangular configuration. When so disposed on any convenient substantially flat horizontal supporting surface (not illustrated), such as may be used during assembly or disassembly of the padded pet collar 10, the rectangular planar configuration of the sleeve element 12 may be further described to have a width dimension of appropriate magnitude to enable the pet collar 14 to be arranged longitudinally thereon substantially centrally of the width of the sleeve element 12, with a first marginal width portion 34, illustrated to the left of the pet collar 14, having an extent in the width direction sufficient to be folded upwardly about the length of the pet collar 14 and thence toward the illustrated right of FIG. 2 such that an inner surface 36 of the sleeve element 12 along the longitudinal extent of the first marginal width portion 34 is substantially in contact with, and substantially traverses the width of, the upper surface 26 of the pet collar 14, and with a second marginal width portion 38, illustrated to the right of the pet collar 14, having an extent in the width direction sufficient to be folded upwardly about the length of the pet collar 14 and thence toward the illustrated left of FIG. 2 such that the inner surface 36 of the sleeve element 12 along the longitudinal extent of the second marginal width portion 38 is substantially proximate to an outer surface 40 of the sleeve element 12 along the longitudinal extent of the first marginal width portion 34, each such fold being accomplished along the entire longitudinal extent of the sleeve element 12.

The plurality of closure elements 32 is further illustrated to comprise pairs of mating elements. In the preferred embodiment, hook and loop mating fasteners are suggested. As an example of their employment, a plurality of first mating half elements 42 are distributed along, and affixed to, the inner surface 36 of the sleeve element 12 proximate to a longitudinal edge 44 of the second marginal width portion 38, and a like plurality of second mating half elements 46 are distributed, in a transversely aligned like arrangement, along, and afixed to, the outer surface 40 of the sleeve element 12 proximate to a longitudinal edge 48 of the first marginal width portion 34. In the preferred embodiment, if hook portions of hook and loop type fasteners are used as the first mating half elements 42, loop portions of hook and loop type fasteners are then to be used as the second mating half elements 46. It is, of course, within the discretion of those practicing the present invention to either reverse the positioning of the hook and the loop portions, or, in fact, to alternate the positioning along the length of the sleeve element 12, so long as each transversely aligned pair consisting of a first mating half element 42 and a second mating half element 46 comprises exactly one hook portion and one loop portion forming a mating fastener.

With reference to FIG. 1 and FIG. 2, alternate embodiments of the closure elements 32 may be utilized in lieu of the preferred hook and loop type fasteners. Male and mating female snap fasteners or button and mating hole fastening methods may be used, but each such alternate requires care in covering portions of such alternate fastening mechanisms that may project from, or be a part of, the outer surface 40 of the sleeve element 12, so that chafing surfaces are not formed on the sleeve element 12. It is even envisioned that a longitudinally extending zipper may be employed to couple the second marginal width portion 38 to the first marginal width portion 34 to form the enclosure for the pet collar 14, again exercising caution to avoid creating chafing surfaces on the sleeve element 12.

Returning briefly to consideration of FIG. 2, a speckled distribution is indicated at 50 to represent the inclusion of a distributed quantity of pesticide or fragrance or perfume on the inner surface 36 of the sleeve element 12, along and adjacent to, the pet collar 14. Such pesticide 50 is intended to be added at the discretion of the user of the padded pet collar 10, and is generally not to be included in any embodiment of the present invention. The present invention, in each of the above emebodiments, merely provides a capability for user addition of such pesticide 50 or other additives.

Referring lastly to FIG. 3, another alternate embodiment of a padded pet collar in accordance with the present invention is indicated generally at 60. The padded pet collar 60 comprises a sleeve element 62 and a pet collar 14. The pet collar 14 is generally equivalent in all respects with the pet collar 14 of the preferred embodiment. However, the sleeve element 62 may be seen to be formed substantially as a cylindrical enclosure for the pet collar 14, without overlapping portions of the sleeve material. In this embodiment, the width of the sleeve material is limited to be that magnitude sufficient to pass fully around the combined width and thickness dimensions of the pet collar 14, with only a marginal added width dimension to permit substantially free longitudinal translation of the cylinder of the sleeve element 62 along the length of the pet collar 14. Abutting lengthwise edges of the sleeve element 62 are, when the sleeve material is appropriately folded to form the cylinder, typically held together by stitching 64 extending along the length of the sleeve element 62 to form a seam 66.

Clearly, in this alternate embodiment, the sleeve element 62 is not capable of being opened along its length for removal from the pet collar 14. Instead, such removal is accomplished by longitudinally translating the pet collar 14 longitudinally through and from the cylinder of the sleeve element 62 until it is fully withdrawn therefrom. Reassembly of the padded pet collar 60 is accomplished in the reverse manner. In all other respects, the functioning of the padded pet collar 60, and its use, are the equivalent of the same or similar functions and uses of the preferred embodiment of the padded pet collar 10. The sleeve element 62 may be removed from the pet collar 14, cleaned, and replaced thereon. Additionally, pesticides, fragrances, and/or perfumes may be introduced through the open ends 68 of the cylinder of the sleeve element 62.

While the foregoing has described a preferred and alternate embodiments of a padded pet collar in accordance with the present invention, it is envisioned that further equivalent configurations, modifications and alternate embodiments may be suggested to those knowledgable in the art. Each such embodiment is to be construed as being within the spirit of the present invention, even though not explicitly set forth herein, the present invention being limited only by the content and scope of the claims appended hereto.

We claim:

1. A padded sleeve and pet collar, comprising:
   a substantially rectangular area of a pliable non-porous material, said material having at least one surface thereof adapted to be non-chafing when in contact with the skin or fur of a wearing pet; said rectangular area having a length dimension substantially equivalent to a length of a pet collar to which said sleeve is to be applied, less that portion of the pet collar used for fastening said collar around a neck of a pet; said rectangular area having a width dimension adapted, when said rectangular area is appropriately folded along its length, to pass across an upper width surface of said collar from a first width edge thereof, downward past a second width edge of said collar opposed to said first width edge thereof, across a lower width surface of said collar from said second width edge to said first width edge, upwardly past said first width edge of said collar, and across that portion of said rectangular area folded over said upper width surface of said collar from said first width edge to said second width edge; and
   a plurality of releasable fastening devices coupling between a surface of said rectangular area, opposed to a surface thereof proximate to said collar, first passing across said upper width surface of said collar and a surface of said rectangular area, proximate to said upper width surface of said collar, passing across said portion of said rectangular area folded over said upper width surface of said collar, said plurality being distributed substantially uniformly along the length dimension of said rectangular area.

2. The padded sleeve for a pet collar of claim 1, wherein said plurality of releasable fastening devices comprises a plurality of mating hook and loop type fastener segments distributed along said length dimension in a spaced apart arrangement.

3. The padded sleeve for a pet collar of claim 2, further comprising a quantity of a pet pesticide distributed along the length dimension of a surface of said rectangular area intended, in use, to be in direct contact with said pet collar, said pesticide being absent from an obverse surface of said rectangular area intended, in use, to be in direct contact with skin or fur of said pet, said material of said sleeve being impervious to penetration of said pesticide therethrough from said surface of distribution to said surface in contact with said pet.

4. The padded sleeve for a pet collar of claim 2, further comprising a quantity of a pet deodorizing fragrance material distributed along the length dimension of a surface of said rectangular area intended, in use, to be in direct contact with said pet collar, said deodorizing fragrance material being absent from an obverse surface of said rectangular area intended, in use, to be in direct contact with skin or fur of said pet, said material of said sleeve being impervious to penetration of said deodorizing fragrance material therethrough from said surface of distribution to said surface in contact with said pet.

5. The padded sleeve for a pet collar of claim 2, further comprising a quantity of a pet perfume distributed along the length dimension of a surface of said rectangular area intended, in use, t be in direct contact with said pet collar, said perfume being absent from an obverse surface of said rectangular area intended, in use, to be in direct contact with skin or fur of said pet, said material of said sleeve being impervious to penetration of said perfume therethrough from said surface of distribution to said surface in contact with said pet.

6. The padded sleeve for a pet collar of claim 1, wherein said plurality of releasable fastening devices comprises a plurality of mating snap type fasteners distributed along said length dimension in a spaced apart arrangement.

7. The padded sleeve for a pet collar of claim 1, wherein said plurality of releasable fastening devices comprises a continuous mating hook and loop type fastener extending substantially fully along said length dimension of said rectangular area.

8. The padded sleeve for a pet collar of claim 1, wherein said plurality of releasable fastening devices comprises a plurality of mating button and loop type fastener devices distributed along said length dimension in a spaced apart arrangement.

9. A padded pet collar, comprising:
   a pet collar having a length and a transverse cross-sectional area, said length being terminated at opposed ends by means for coupling said opposed ends together;
   a sleeve element, formed of a substantially pliable non-porous, non-chafing, padded material into an annular cylinder having a length commensurate with the length of said collar less said terminating end fastening means, and having an internal cross-sectional longitudinal opening adapted to receive the transverse cross-section of said collar therethrough., said sleeve element including a circumferential overlapped portion which is separable along the length of the collar such that said sleeve element may be unfolded from its annular cylindrical configuration to a substantially rectangularly planar configuration; and
   means for releasably coupling said circumferentially overlapping portion so as to form said annular cylindrical configuration.

10. A padded pet collar, comprising:
    a pet collar having a length and a transverse cross-sectional area, said length being terminated at opposed ends by means for coupling said opposed ends together; and a sleeve element, formed of a substantially pliable non-porous, non-chafing, padded material into an annular cylinder having a length commensurate with the length of said collar less said terminating end fastening means, and having an internal cross-sectional longitudinal opening adapted to receive the transverse cross-section of said collar therethrough; said sleeve element being formed from a substantially rectangular area of said material which is appropriately folded to form said annular cylindrical configuration, with a seam being formed along said length direction.

* * * * *